3,342,888
PRODUCTION OF LOW 2-PHENYL ISOMER CONTENT MONOALKYLBENZENE FRACTIONS
William J. De Witt, Willingboro, N.J., and Harold A. Sorgenti, Philadelphia, and Robert C. Taylor, King of Prussia, Pa., assignors to The Atlantic Refining Company, Philadelphia, Pa., a corporation of Pennsylvania
Filed Feb. 17, 1965, Ser. No. 433,327
4 Claims. (Cl. 260—671)

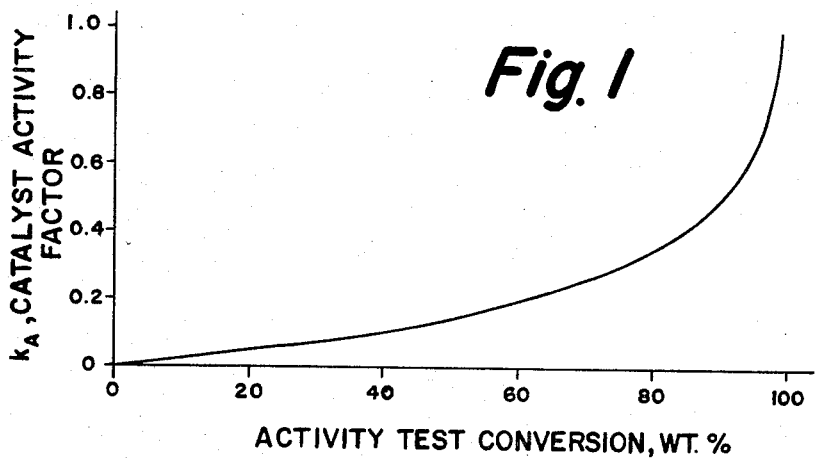
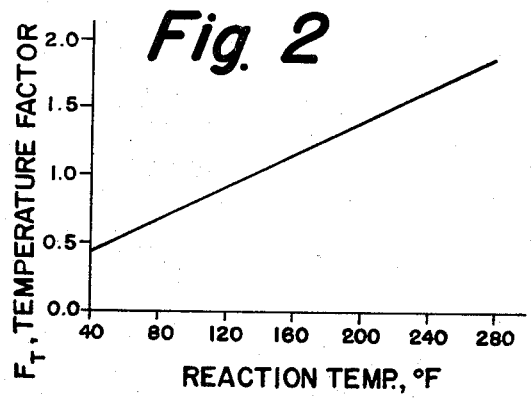
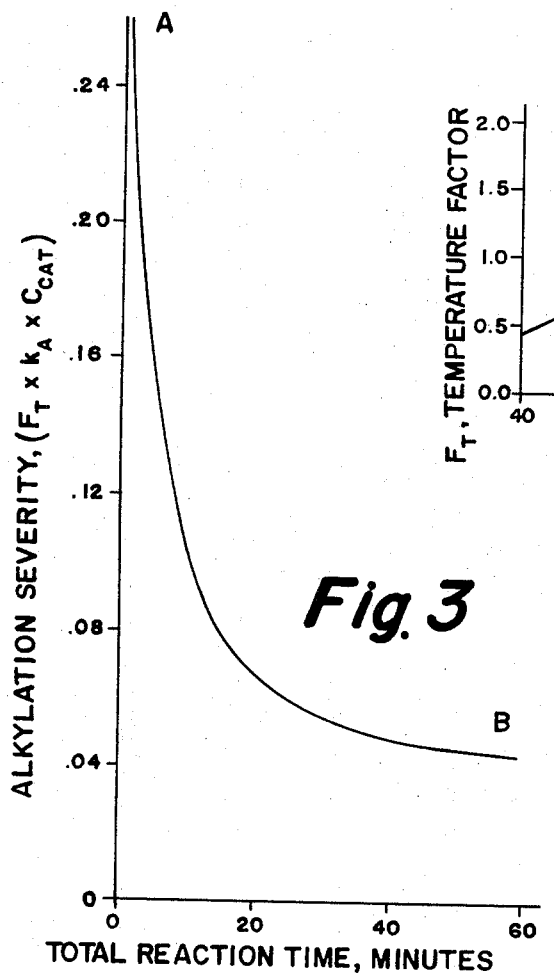
INVENTORS.
WILLIAM J. DE WITT
HAROLD A. SORGENTI
ROBERT C. TAYLOR
BY Norbert E. Birch
ATTORNEY

United States Patent Office 3,342,888
Patented Sept. 19, 1967

This invention relates to a method for the alkylation of benzene with straight chain alkylchlorides using aluminum chloride as the catalyst and, in particular, this invention relates to the two-stage alkylation of benzene with straight chain alkylmonochlorides using an aluminum chloride catalyst to produce a mixture of the monoalkylated benzene isomers wherein the 2-phenyl isomer content is markedly reduced below usually obtained amounts with this catalyst.

In recent years manufacturers of alkylbenzene sulfonate detergents have been faced with the problem of the biodegradability of such detergents. The method most widely employed for manufacturing such detergents involved polymerizing propylene to the $C_9$–$C_{15}$ range, alkylating benzene with the resulting polymer, sulfonating the alkylated benzene, and neutralizing the alkylbenzene sulfonic acids to obtain the finished detergent. The alkyl groups of alkylbenzene sulfonates produced in this manner are highly branched and are highly resistant to biodegradation, thus causing problems of contamination in streams, rivers, water supplies and disposal plants. It has been found, however, that if the alkyl group of the alkylbenzene sulfonate is straight chain the biodegradability of the sulfonate is greatly increased and the compound is termed biosoft or biodegradable.

One method of preparing alkylbenzene sulfonate wherein the alkyl group is straight chain involves chlorinating straight chain paraffinic hydrocarbons having the desired number of carbon atoms in the molecule to produce predominantly monochlorinated paraffins, alkylating benzene with the resulting straight chain alkylchlorides in the presence of an aluminum chloride catalyst to produce predominantly monoalkylated benzenes and sulfonating the monoalkylated benzenes. In carrying out the chlorinating and alkylating reactions thus described the monochloroparaffins react to produce all of the possible isomers of the monoalkylbenzenes. Thus there will be a small percentge of the total of the monoalkylbenzenes wherein the alkyl group is attached to the benzene ring through a terminal carbon of the alkyl chain. A much greater percentage of the total of the monoalkylbenzenes will have the alkyl group attached to the benzene ring through the second carbon atom on the alkyl chain and smaller percentages of the total of the monoalkylbenzenes will have the alkyl group attached to the benzene ring through the other carbon atoms along the chain. For convenience, when the alkyl group is attached to the benzene ring through the terminal carbon atom on the alkyl chain, the monoalkylbenzene is designated as the 1-phenyl isomer, when the alkyl group is attached to the benzene ring through the second carbon atom on the alkyl chain the monoalkylbenzene is designated as the 2-phenyl isomer, when the alkyl group is attached through the third carbon atom the compound is termed the 3-phenyl isomer and so on.

When paraffins are chlorinated to produce the monochlorinated product it is well known that some di- and polychlorinated paraffins will be produced also, but that the production of the di- and polychlorinated paraffins can be minimized by converting only from 10 to 15 percent of the paraffins to the chlorides. Under these conditions the selectivity of the reaction for the monochlorides will be from about 90 to 95 percent. All possible isomers of the monochlorides will be formed. The isomer wherein the chlorine atom is attached to a terminal carbon atom, i.e. the primary chloride, is present in the smallest amount, whereas the isomers wherein the chlorine atom is attached to one of the secondary carbon atoms along the chain are present in larger amounts. In general, the amounts of the secondary isomers differ from each other by relatively small quantities, i.e. the 2-chloro, 3-chloro, 4-chloro, etc. are present in amounts that differ from each other only by small quantities but are present in larger amounts than the 1-chloro compound. It has been found, however, that under alkylation conditions wherein substantially complete conversion is obtained there will be produced a larger quantity of the 2-phenyl isomer than of the other isomers. The reason for the high 2-phenyl isomer content may be explained by the fact that when alkylating benzene with the mixed chloroparaffins the secondary chloroparaffins alkylate more readily, whereas the 1-chloroparaffins (the primary chloroparaffins) require more severe conditions. Consequently, when severe alkylating conditions are used to obtain this complete conversion, isomerization occurs during and after alkylation such that the 2-phenyl content of the alkylate is higher than would be expected from the charge monochloroparaffin isomer distribution and approaches the equilibrium value.

Recently it has been found that for heavy duty alkylbenzene sulfonates (generally $C_{12}$ to $C_{14}$ alkyl chain length) the foam or suds characteristics improve with decreasing 2-phenyl isomer content of the alkylated benzene isomers from which the sulfonate is produced. This is set forth in the article by J. Rubinfeld et al. in The Journal of the American Oil Chemists' Society, vol. 41, pages 822–26 (1964).

In the prior art processes for the alkylation of benzene with alkylmonochlorides using aluminum chloride as the catalyst the amount of the 2-phenyl isomer produced approaches the equilibrium 2-phenyl isomer concentration, i.e. 32 percent to 34 percent for a $C_{12}$ alkyl side chain alkylbenzene, the exact percentage depending on the method of analysis employed. Although it is possible to reduce the 2-phenyl content of the thus produced alkylate by fractionation or other separation techniques, these methods are costly, they are applicable only to narrow molecular weight ranges and there is a disposal problem of the 2-phenyl isomer thus separated.

The present invention provides a method for the two-stage alkylation of benzene with straight chain alkylmonochlorides utilizing an aluminum chloride catalyst to produce a monoalkylated benzene product having a 2-phenyl isomer content substantially lower than normally obtainable by known aluminum chloride catalyzed alkylation processes.

It is an object of this invention to provide a method for the two-stage alkylation of benzene with straight chain alkylmonochlorides utilizing an aluminum chloride catalyst.

It is another object of this invention to provide a method of alkylating benzene to produce an alkylated benzene fraction having a reduced 2-phenyl isomer content.

Other objects of this invention will be apparent from the description and claims that follow.

In accordance with this invention benzene is alkylated with straight chain alkylmonochlorides in two stages utilizing an aluminum chloride catalyst system in both stages. The catalyst severity, i.e. concentration and activity, and the reaction times are selected to minimize the isomerization reactions which occur during and after the alkylation reactions. By the proper selection of these variables as will be described, the only change in reaction conditions between the two alkylation stages is the temperature.

The invention is further described by means of the drawings wherein FIGURE 1 shows the catalyst activity factor plotted against the activity test conversion; FIGURE 2 shows the temperature factor plotted against reaction temperature; and FIGURE 3 shows alkylation severity plotted against total reaction time.

The alkyl group attached to the benzene ring of the alkylmonochlorides prepared in accordance with this invention contain from 10 to 16 carbon atoms in order to produce alkylbenzene sulfonates suitable as commercial detergents. Preferably, however, for heavy duty detergents the alkyl group attached to the benzene ring should contain from about 12 to 14 carbon atoms. In order to produce these alkylated benzenes it is necessary to employ alkylmonochlorides having the corresponding number of carbon atoms to alkylate the benzene. As has been pointed out it is desired that the alkyl group be straight chain for biodegradability of the finished detergent. Accordingly, the alkylmonochlorides may be prepared by chlorinating straight chain paraffin hydrocarbons in the desired carbon number ranges under conditions which produce predominantly the paraffin monochlorides. The chlorination may be carried out in a continuous reactor at a temperature in the range of from about 220° F. to 350° F. at a chlorine pressure of from 5 to 50 p.s.i.g. The mole ratio of paraffin to chlorine is in the range of from 5:1 to 10:1 and the conversion under these conditions is generally of the order of 10 to 20 percent with a selectivity of from 80 to 95 percent paraffin monochloride with the remainder of the chlorinated products being the di- and polychlorinated paraffins. The unreacted paraffins merely dilute the product mixture and accordingly in commercial operation these unreacted paraffins are not separated from the chlorinated paraffins but the entire product mixture is used in the alkylation reaction. Moreover, it has been found that the chlorinated product obtained at 20 percent conversion is of the order of 80 percent paraffin monochloride and 20 percent paraffin di- and polychlorides. Di- and polychloroparaffins normally convert to heavy product and thus represent a yield loss. It is therefore preferable to minimize the di- and polychloroparaffin content by operating at low conversions, i.e. 10 to 15 percent where selectivity is 90 to 95 percent monochloroparaffin.

The catalyst employed in the alkylation process of this invention is a conventional liquid aluminum chloride complex, for example a complex of aluminum chloride with the alkylated benzenes produced, or a complex with an aromatic hydrocarbon, e.g. benzene. The aluminum chloride consists of about 40 weight percent of the complex with the remainder being the hydrocarbon. Such a liquid complex catalyst system is well known and is the aluminum chloride catalyst system conventionally employed in the alkylation of benzene with alkylchlorides. The activity of the catalyst system can be increased by the addition of the desired amount of fresh aluminum chloride to the system or decreased by adding other complexing agents such as nitromethane which forms a more stable complex and thus lowers the activity or by the addition of water which deactivates the catalyst. The catalyst during its use for alkylation is deactivated by tars and heavy products formed during the reaction. The quantity of fresh aluminum chloride added thus controls the level of activity of the catalyst. The aluminum chloride content of the catalyst which may vary from 35 weight percent to 45 weight percent of the liquid complex catalyst system is not a sufficient criterion of catalyst activity since deactivation may have occurred through use or by the addition of a deactivating material. Catalyst activity is an important factor in controlling catalyst severity which in turn is an important part of the present two-stage alkylation process.

In order to accurately determine catalyst activity a test method was devised.

In carrying out the test to determine the activity of an aluminum chloride catalyst, 50 ml. of a mixture of benzene, 1-chlorododecane, and dodecane is dried over magnesium sulfate and charged to a flask. The mixture is heated to reaction temperature (200° F.) and 1 ml. of the liquid aluminum chloride catalyst complex is added. The reaction mixture has the composition:

| | Volume ratio |
|---|---|
| Benzene/1-chlorododecane | 5/1 |
| Dodecane/1-chlorododecane | 9/1 |
| Catalyst complex/1-chlorododecane | 0.3/1 |

One minute after the addition of the liquid aluminum chloride complex to the reaction mixture, a sample of the reaction mixture is taken and analyzed by gas chromatography to determine the quantity of 1-chlorododecane which has been converted, i.e. which has reacted.

The conversion of 1-chlorododecane (primary chloride) can be related to time, catalyst severity and temperature through the following relationship:

$$\ln \frac{1}{1-X_P} = k_P k_A C_{cat.}^{1.5} C_B^{1.5} t \quad \text{(Equation 1)}$$

where $X_P$ is the fraction of primary chloride converted; $C_{cat.}$ is the aluminum chloride concentration in moles per liter; $C_B$ is the benzene concentration in moles per liter; $t$ is the reaction time in minutes; $k_A$ is the catalyst activity factor; $k_P$ is the reaction rate constant for primary chloride (a function of temperature); and where the value of $k_P$ at three representative temperatures is 200 at 250° F.; 32 at 200° F. and 12 at 175° F., the units of $k_P$ being (moles/liter)$^{-3}$(minutes)$^{-1}$. Since the plot of the ln $k_P$ versus $1/T$, where T is the absolute temperature, is a straight line, the value of $k_P$ at any temperature may be found from the representative values set forth above.

Since all the other variables which affect the rate of reaction, i.e. time, temperature, catalyst concentration and benzene concentration are held constant for the test the only variables in the test are conversion and catalyst activity. The catalyst activity factor ranges between 0 and 1.0. The $k_A$ was arbitrarily assigned a value of 1.0 for a conversion fraction $X_P$ of 0.99 at test conditions and a value of 0 for a conversion of 0. The values of the activity factor between these limits were calculated for their corresponding conversions. The resulting curve is shown in FIGURE 1 of the drawings. It will be seen from this figure that the activity factor of any catalyst may be read from the curve simply by measuring the quantity of 1-chlorododecane converted at test conditions in one minute. It should be noted that all concentrations in Equation 1 which are in moles per liter refer to moles per liter of the entire reaction mixture.

In addition to catalyst activity, catalyst concentration is the second important factor in determining catalyst severity in the alkylation reaction. Catalyst severity therefore is defined as the product obtained when $k_A$, the catalyst activity factor is multiplied by the concentration of aluminum chloride in moles per liter of reaction mixture, i.e. $k_A \times C_{cat.}$.

The following examples are provided for the purpose of illustrating the critical reaction conditions required to attain the objects of this invention.

EXAMPLE I

In order to show the effect of catalyst severity on the 2-phenyl isomer content of the monoalkylbenzenes, a number of experimental runs were carried out.

In carrying out these experimental runs benzene, dodecane and the aluminum chloride catalyst complex were added to the reaction flask and heated to the reaction temperature. A mixture of $C_{12}$ alkyl chlorides were then added at a constant rate over a five-minute period. The $C_{12}$ alkyl chlorides consisted of approximately 90 weight percent monochlorododecanes and 10 weight percent di- and polychlorododecanes. The monochlorodecanes consisted of approximately 8–10 weight percent of the 1-chlorododecane (primary chloride) and approximately equal quantities (i.e. about 18 weight percent ±3 percent) of the 2-chloro, 3-chloro, 4-chloro, 5-chloro, and 6-chlorododecanes which for convenience were called the secondary chlorides. The reaction was carried out at atmospheric pressure (except as noted). The reation mixture had the following composition:

| | Grams |
|---|---|
| Benzene | 218 |
| Dodecane | 337 |
| Alkylchlorides | 43 |
| Aluminum chloride catalyst | Variable |

Conversion and 2-phenyl isomer content were determined by gas chromatographic analysis on samples taken immediately after completion of the alkylchloride addition and at timed intervals thereafter. Table I sets forth the experimental variables and results obtained. Reaction times in all experimental runs were measured from the point of initial addition of alkylchlorides to the reaction mixture. The alkylchlorides were added to a stirred reacton mixture and the stirring was continued during the entire reaction period.

F. this value is approximately 0.016, for example. Catalyst severities below this value serve only to lower the extent of conversion, but do not chance the 2-phenyl content of the alkylate produced. The data further show that lower 2-phenyl contents are obtained when little or no conversion of the primary chloride (1-chloro compounds) has occurred in approximately the same reaction time (compare run No. 115 with run No. 84, 89, or 91). This statement holds for partial or complete conversion of the secondary chlorides (compare run Nos. 116 and 115).

It will be noted that essentially complete conversion of the 1-chloro compounds can be obtained with low catalyst severities, but only by employing exceedingly long reaction times which are impractical for commercial operation (see run No. 84, i.e. 240 minute reaction time). The other means of obtaining complete conversion without increasing reaction temperature of both the primary and secondary chlorides in a reasonably short time, i.e., by increasing catalyst severity, results in the production of 2-phenyl isomers approaching that of the equilibrium value (see runs No. 89 and 91). Similiar effects of catalyst severity have been found at other temperature levels studied.

Since the unreacted 1-chloro compounds cannot be easily separated from a $C_{12}$–$C_{14}$ alkylbenzene fraction which is to be sulfonated and are detrimental to product quality, it is necessary to obtain essentially complete conversion not only of the secondary alkylchlorides but also of the primary alkyl chlorides, i.e., the 1-chloro compounds. It is well known that increasing reaction temperature increases reaction rates and thus should enable more rapid conversion of the 1-chloro compounds at low catalyst severities and reasonable reaction times. The 2-phenyl content of the monoalkylbenzenes, however, increases with increasing reaction temperature, irrespective of the catalyst severity employed.

TABLE I

| | Run No. | | | | | | | | | |
|---|---|---|---|---|---|---|---|---|---|---|
| | 116 | | 115 | | 84 | | 89 | | 91 | |
| Temperature, °F | 135 | | 135 | | 135 | | 135 | | 135 | |
| Catalyst complex activity $k_A$ | 0.358 | | 0.358 | | 0.097 | | 0.358 | | 0.358 | |
| $AlCl_3$ conc. $C_{cat.}$, mols/liter | 0.023 | | 0.045 | | 0.360 | | 0.369 | | 0.666 | |
| Catalyst Severity $k_A C_{cat}$ | 0.0083 | | 0.016 | | 0.035 | | 0.132 | | 0.238 | |
| | P[1] | S[1] | P[1] | S[1] | P[1] | S[1] | P[1] | S[1] | P[1] | S[1] |
| Wt. percent conversion, React. Time in Minutes: | | | | | | | | | | |
| 5 | 0 | 12.6 | 0 | 74.7 | 28.0 | 86 | 76.0 | 100 | 100 | 100 |
| 15 | | | | | | | | | | |
| 20 | 0 | 25.2 | 0 | 100 | | | | | | |
| 30 | | | | | 62.7 | 100 | 100 | 100 | | |
| 60 | | | | | | | 100 | 100 | | |
| 240 | | | | | 97.6 | 100 | | | | |
| 2-phenyl content,[2] after React. Time in Minutes: | | | | | | | | | | |
| 5 | 22.3 | | 25.1 | | 26.8 | | 27.5 | | 30.5 | |
| 15 | | | | | | | | | 32.1 | |
| 20 | 25.3 | | 25.2 | | | | | | | |
| 30 | | | | | 26.3 | | 31.6 | | | |
| 60 | | | | | | | 32.1 | | 32.1 | |
| 240 | | | | | 27.5 | | | | | |

[1] P=1-chlorododecane; S=secondary chlorododecanes.
[2] Weight percent of total monoalkylbenzenes.

These data show that as the catalyst severity is increased above a critical value at a constant reaction temperature the 2-phenyl production is increased. For 135°

EXAMPLE II

In order to demonstrate the effect of reaction temperature on the 2-phenyl isomer content of the monoalkylbenzenes produced in a single stage process, a series of runs identical with those of Example I were carried out, except that different reaction temperatures were employed. The conditions and results are shown in Table II.

Since even at the lower temperatures the 2-phenyl content of the monoalkylbenzenes is higher than the 2-chloroparaffin content of the charge, it is obvious that isomerization must have occurred. This isomerization can

TABLE II

| | Run No. | | | | | | | | | |
|---|---|---|---|---|---|---|---|---|---|---|
| | 132 | | 112 | | 86 | | 87 | | 37 | |
| Temperature, °F | 45 | | 210 | | 210 | | 210 | | [3] 250 | |
| Catalyst complex activity, $k_A$ | 0.284 | | 0.358 | | 0.097 | | 0.99 | | 0.031 | |
| $AlCl_3$ conc., $C_{cat.}$, mols/liter | 0.369 | | 0.023 | | 0.132 | | 0.045 | | 0.132 | |
| Catalyst Severity, $k_A C_{cat}$ | 0.105 | | 0.0083 | | 0.013 | | 0.045 | | 0.0041 | |
| | P[1] | S[1] | P[1] | S[1] | P[1] | S[1] | P[1] | S[1] | P[1] | S[1] |
| Wt. percent conversion, React. Time in Minutes: | | | | | | | | | | |
| 5 | 5.4 | 100 | 34.2 | 63.1 | 38.7 | 96.6 | 54.7 | 100 | | |
| | | | | | 96.2 | 100 | | | | |
| 15 | 36.9 | 100 | 34.2 | 74.2 | | | | | | |
| 20 | | | | | 100 | 100 | | | 99 | 100 |
| 30 | | | | | | | 100 | 100 | | |
| 60 | 68.5 | 100 | | | | | | | | |
| 240 | | | | | | | | | | |
| 2-phenyl content,[2] After React. Time in Minutes: | | | | | | | | | | |
| 5 | 23.3 | | 24.9 | | 29.0 | | 28.8 | | | |
| 15 | | | | | 28.6 | | 29.8 | | | |
| 20 | 24.3 | | 28.9 | | | | | | 32 | |
| 30 | | | | | 28.6 | | | | | |
| 60 | 25.9 | | | | | | 30.5 | | | |
| 240 | | | | | | | | | | |

[1] P=1-chlorododecane; S=secondary chlorododecanes.
[2] Weight percent of total monoalkylbenzenes.
[3] At 22 p.s.i g It will be noted that although the catalyst severity was decreased with increasing temperature, nevertheless the 2-phenyl content of the monoalkylbenzene fraction increased. This demonstrates that it is not possible to obtain simultaneously low 2-phenyl contents and complete conversion in a reasonably short reaction time in a single stage reaction process simply by increasing the reaction temperature and attempting to compensate the increased temperature with decreased catalyst severity. This is demonstrated particularly by comparing run Nos. 86, 87 and 112. In run Nos. 86 and 87 a conversion of approximately 100% was obtained in 15 minutes with a catalyst severity of 0.013 and 0.045 respectively; however, a 2-phenyl content of 28.6 and 28.8 weight per cent were obtained. It will be noted that in 20 minutes with a catalyst severity of only 0.008, only 74 percent of the secondary chloro compound had been converted and only 34 percent of the primary chloro compounds had been converted, yet the 2-phenyl isomer content was 28.9 essentially the same as in run Nos. 86 and 87. Clearly, therefore, merely lowering the catalyst severity at this reaction temperature would not affect the 2-phenyl content but only lower conversion. The 2-phenyl content of the monoalkylbenzenes. Therefore, increases with increased reaction temperature even at minimum catalyst severity. The independent effect of temperature on 2-phenyl content is summarized in the following tabulation:

| Run No. | Temperature, °F. | 2-phenyl $C_{12}$. Wt. Percent of Monoalkylbenzenes |
|---|---|---|
| 132 | 45 | 23.3 |
| 115 | 135 | 25.2 |
| 86 | 210 | 28.6 |
| 37 | 250 | 32 |

The above comparison is at the time interval when complete conversion of the secondary chlorides has occurred.

occur concurrently with alkylation and subsequent to alkylation. Increasing reaction temperatures evidently increases the rate of isomerization which occurs concurrently with alkylation relative to the rate of the alkylation reaction, resulting in higher 2-phenyl production at higher temperatures irrespective of the catalyst severity employed.

The isomerization occurring concurrently with alkylation is much more rapid than that occurring after alkylation. Isomerization occurring subsequent to alkylation requires considerably higher catalyst severity than isomerization concurrent with alkylation. This is shown by comparing the results of run Nos. 115, 84, 89 and 91. Although the 2-phenyl content increased with increasing catalyst severity, i.e. from 25.2 of run No. 115 to 26.3 in run No. 84, there was only a relatively slow change in 2-phenyl content in run No. 84 with time after complete alkylation of the secondary chlorides had been achieved. In run Nos. 89 and 91, however, in addition to showing a higher 2-phenyl content at the 5 minute level when complete conversion had been attained, as the products were held at this temperature the 2-phenyl content increased rapidly to the equilibrium level. This demonstrated that isomerization subsequent to alkylation had occurred. Althuogh in run No. 84 a higher 2-phenyl value was obtained than in run No. 115, it was obtained without rapid subsequent change after alkylation, thus this higher 2-phenyl value must have resulted from isomerization concurrent with the alkylation reaction which must occur therefore more rapidly and at lower catalyst severity than isomerization after alkylation. Isomerization subsequent to alkylation was also clearly shown at other temperature levels, i.e. run Nos. 87 and 132.

It is obvious, therefore, that for a given catalyst severity the change in 2-phenyl isomer content as a function of time will be more rapid the higher the temperature employed.

The effect of temperature on the rate of isomerization subsequent to alkylation was further defined by similar experiments at other temperature levels. From these data the change in the degree of isomerization occurring after alkylation at a given time and catalyst severity was established and is summarized by means of FIGURE 2 of the drawings. In this figure, $F_T$ is plotted against temperature. With other conditions being held constant the rate of isomerization increases with increased temperature. The effect of temperature on the rate of isomerization is defined using the rate at 135° F. as a standard condition. The ratio of the isomerization reaction rates at other temperatures are expressed by the factor $F_T$.

Thus at 135° F., for example, $F_T$ is 1.0 and at 210° F. $F_T$ is 1.45; consequently the change in 2-phenyl content for a given catalyst severity and time would be 1.45 times greater at 210° F. than at 135° F.

Isomerization subsequent to alkylation is a function of the alkylation severity, i.e., catalyst severity and temperature as well as reactive time. FIGURE 3 of the drawings relates alkylation severity ($F_T \times k_A \times C_{cat.}$) and reaction time to the change in 2-phenyl content as a percentage of the difference between the initial value and the equilibrium 2-phenyl value. Thus for example, if in a given reaction at the point of complete conversion of the secondary chlorides a 26 percent 2-phenyl product is obtained at a catalyst severity of 0.045, the product may only be held at 135° F. for an additional 40 minutes without incurring isomerization greater than 20 percent of the difference between the starting value (26 percent) and the equilibrium value (32 percent) or 0.20 × 6.0 = 1.2 units. This isomerization would increase the 2-phenyl content to 27.2 percent by the end of 40 minutes at 135° F. A similar degree of isomerization would be obtained in only 22 minutes at 210° F.

It has been shown that to achieve complete conversion of primary chlorides at low temperatures, exceptionally long times or high catalyst severities are required. If catalyst severity is increased to a level where complete conversion can be obtained in a reasonable time, then 2-phenyl content increases and approaches the equilibrium 2-phenyl value. At low catalyst severities the reaction times required for complete conversion are impractical for commercial operation. Increasing reaction temperature to reduce the time required for complete conversion of the 1-chloro compounds results, even at low catalyst severities, in products with high 2-phenyl contents.

To achieve the desired reduction in 2-phenyl content in accordance with this invention, alkylation is carried out in two stages. In the first stage, conditions are selected such that little or no primary chlorides are converted but the secondary chloroparaffins are reacted essentially completely in a short time, i.e. in from 2 to 30 minutes. This minimizes the concurrent isomerization of the monoalkylbenzenes formed from the secondary chloroparaffins (i.e. about 90 weight percent of the total monoalkylbenzenes finally produced from both stages) which isomerization would result in a higher 2-phenyl content of these monoalkylbenzenes produced in the first stage. Reaction temperatures in the range of from 45° F. to 150° F. are employed in the first stage, but temperatures in the range of from 100° F. to 135° F. are preferred. In the second stage, the reaction temperature is increased such that complete conversion of the 1-chloroparaffin is obtained in from 2 to 30 minutes. Reaction temperatures in the range of from 175° F. to 250° F. are employed in the second stage. The same catalyst is preferably used in both alkylation stages. In general the catalyst concentration is preferably in the range of from 0.01 to 1.0 mole of aluminum chloride per liter of reaction mixture for both alkylation stages and the benzene to alkylchloride ratio is in the range of from 2:1 to 10:1.

In order to obtain substantially complete total conversion (i.e. greater than 99 percent) in the overall alkylation reaction, conversion of primary chlorides in the second stage must be at least 95 percent. This is necessary since the primary chloride content normally amounts to about 10 weight percent of the total monochloride feed to the alkylation reaction. In accordance with the invention, the reaction time and temperature employed in the second stage are arbitrarily selected within the limits defined above and the catalyst severity required to achieve the 95 percent or higher primary chloride conversion is calculated from Equation 1 set forth hereinbefore. The catalyst severity, time and temperature, however, are also subject to the limitation of falling within the alkylation severity-time relationship defined by curve AB in FIGURE 3. Thus, if the time and temperature which were initially selected require a catalyst severity from Equation 1 which would produce greater than 20 percent isomerization as shown in FIGURE 3 then it would be apparent that a different temperature or time would be required. Having selected a temperature and time relationship and calculated a catalyst severity which produced the 95 percent conversion of primary chlorides in the second stage and which, in addition, gives less than the 20 percent isomerization as shown by curve AB of FIGURE 3, the conditions for the first stage alkylation can be calculated. In the first stage as has been pointed out, the secondary chlorides are substantially completely converted by alkylation to form the corresponding monoalkylbenzenes. The secondary chloride conversion is related to time, catalyst severity and temperature by the following equation:

$$\ln \frac{1}{1-X_S} = k_S k_A C_{cat.}^{1.5} C_B^{1.5} t \quad \text{(Equation 2)}$$

Where $C_{cat.}$, $C_B$ and $t$ are the same as in Equation 1; $X_S$ is a fraction of secondary chlorides converted; $k_S$ is a reaction rate constant for secondary chlorides (function of temperature); and where the value of $k_S$ at three representative temperatures is 190 at 135° F.; 118 at 100° F.; and 53 at 45° F., the units of $k_S$ being $$(\text{moles/liter})^{-3}(\text{minutes})^{-1}$$

As in the case of $k_P$, a plot of $\ln k_S$ versus $1/T$ is a straight line so that the value of $k_S$ can be found for any temperature from the representative values set forth. $k_A$ is the catalyst activity factor.

The temperature for the first stage is arbitrarily selected within the limits set forth above and the time required to obtain substantially complete (i.e. greater than 99 percent) conversion of the secondary chlorides at the catalyst severity of the second stage is calculated from Equation 2.

EXAMPLE III

A set of experiments were carried out in order to compare single stage alkylation with two-stage alkylation. The single stage alkylation runs were carried out in the same manner as in Examples I and II and the first stage of both two stage runs was also carried out in the same manner as in Examples I and II. In the two stage runs at the conclusion of the reaction in the first stage the stirring was discontinued and the catalyst complex phase settled rapidly to the bottom of the reactor where it was drawn off. The remainder of the reaction mixture was then heated to the reaction temperature of the second stage while being continuously stirred. When the desired temperature had been attained the catalyst complex which had been separated was added to the reaction mixture and the reaction was carried out for the time specified for the second stage at the reaction temperature desired for the second stage.

This procedure was utilized since in the laboratory it was not possible to heat the reaction mixture rapidly from the first stage temperature to the second stage temperature. In commercial operation, however, the reaction mixture leaving the first stage can be heated rapidly to the second stage temperature and catalyst separation is unnecessary. In the runs employed in this example the temperature of the first stage was selected as 120° F. and that of the second stage as 210° F. with a time of 20 minutes in the second stage and a catalyst severity of 0.019. In one two-stage run the straight chain $C_{12}$ alkylmonochlorides described for Examples I and II were utilized as the alkylating agent for the benzene and in the second two-stage run a mixture of straight chain $C_{13}$ and $C_{14}$ alkylmonochlorides in a ratio of 62 weight percent $C_{13}$ alkylmonochloride and 38 weight percent $C_{14}$ alkylmonochloride was employed. The isomer distribution in these compounds was approximately that of the $C_{12}$ alkylmonochloride. The experimental conditions and results obtained are shown in Table III.

ucts by hte single stage process in the same time and catalyst severities at the 99 percent total conversion level. Moreover, a temperature of 120° F. was selected for the first stage of the two stage runs since this temperature may be employed commercially without expensive refrigeration. Lower temperatures obviously could have been employed, for example, 45° F. and as shown by the data in Example II a decrease in total 2-phenyl isomer

TABLE III

| Run No. | Stage | Monoalkyl chloride charge | Temp., °F. | Catalyst Severity, $k_A C_{cat.}$ | Reaction Time, Min. | Conversion, Wt. Percent | 2-phenyl, Wt. Percent of Monoalkylbenzenes |
|---|---|---|---|---|---|---|---|
| A-1 | First | $C_{12}$ | 120 | 0.019 | 20 | 93.6 | 25.2 |
|  | Second |  | 210 | 0.019 | 20 | 99.6 | 25.4 |
| 86 | Single | $C_{12}$ | 210 | 0.013 | 20 | 100 | 28.6 |
| B-1 | First | $C_{13}$-$C_{14}$ | 120 | 0.019 | 30 | 93.6 | 24.1 |
|  | Second |  | 210 | 0.019 | 20 | 99.2 | 24.3 |
| B-2 | Single | $C_{13}$-$C_{14}$ | 210 | 0.024 | 20 | 99.0 | ¹26.3 |

¹ Equilibrium 2-phenyl content is 28.7 weight percent.

It will be seen from the data in the two-stage experiments that the conversion obtained in the first stage in both runs exceeded the desired 90 percent level by 3.6 percent, i.e. there was complete conversion of the secondary alkylmonochlorides and some conversion of the primary alkylmonochlorides. It was calculated from Equation 2 that from the point of complete chloride addition only approximately two minutes is required at this catalyst severity for the complete conversion of the secondary alkylmonochlorides at 120° F. and since in one run 20 minutes was used and in the other run 30 minutes was used it is apparent that a higher than desired value for the conversion of the alkyl chlorides wos obtained, i.e. there was some conversion of primary alkyl chlorides together with some isomerization resulting in a higher 2-phenyl content in the first stage. Accordingly, had the proper times been employed an even lower 2-phenyl content would have been obtained and the difference between the 2-phenyl content obtained with the two stage alkylation runs and the single stage alkylation runs would have been greater. The reason that the two-minute reaction times were not employed is that such times are exceedingly difficult to obtain in the laboratory because of difficulties in attaining proper mixing conditions and reproducible results. Such difficulties, however, do not arise in plant scale operations wherein the reactants and catalyst can be admixed simultaneously and continuously so that the reaction time may be easily controlled to any desired length.

It will be seen from the results in Table III that a decrease in the total 2-phenyl isomer content of at least 10 percent can be obtained by the two stage process of this invention. As shown in the above-mentioned article by J. Rubinfeld et al., such a decrease in 2-phenyl content will produce a marked improvement in performance of the sulfonate detergent made from the monoalkylbenzenes having such a reduced 2-phenyl content. It will be noted that in one of the single stage runs a catalyst severity slightly lower than that employed in the corresponding two stage run was utilized and in the other comparison the catalyst severity was slightly higher than in the corresponding two stage run. In each run, however, the total conversion attained in the single stage was greater than 99 percent in the twenty minute reaction time utilized in the second stage, but the 2-phenyl content was higher. As has been demonstrated by the data in Examples I and II, however, it is quite apparent that it never would have been possible to obtain the lower 2-phenyl isomer products content of from 20 to 25 percent could have been realized.

We claim:
1. A method for the two stage alkylation of benzene with straight chain alkylmonochloride isomers having from 10 to 16 carbon atoms in the molecule to produce a mixture of monoalkylated benzene isomers wherein the 2-phenyl isomer is present in an amount less than that obtainable in a single stage under similar conditions of catalyst severity and reaction time which comprises contacting benzene with a mixture of straight chain alkylmonochloride isomers having from 10 to 16 carbon atoms in the molecule at a temperature in the range of from 45° F. to 150° F. for a time ranging from 2 to 30 minutes in the presence of a liquid aluminum chloride complex catalyst, contacting the reaction mixture from the first stage at a temperature in the range of from 175° F. to 250° F. for a time ranging from 2 to 30 minutes in the presence of said liquid aluminum chloride complex catalyst, said catalyst having a concentration and activity defined by curve AB of FIGURE 3 of the drawings such that no more than 20 percent of the difference between the equilibrium 2-phenyl isomer value and the amount of 2-phenyl isomer produced in the first stage is lost in the second stage by the isomerization of the monoalkylbenzenes produced in the first stage and said catalyst having a concentration and activity such that greater than 99 percent total conversion of the monoalkylchlorides is obtained in both stages with at least 90 percent conversion being obtained in the first stage.

2. The method according to claim 1 wherein the temperature in the first stage is in the range of from 100° F. to 135° F.

3. The method according to claim 1 wherein the straight chain alkylmonochloride isomers have from 12 to 14 carbon atoms in the molecule.

4. The method according to claim 1 wherein the straight chain alkylmonochloride isomers have from 12 to 14 carbon atoms in the molecule and the reaction temperature in the first stage is in the range of from 100° F. to 135° F.

References Cited

UNITED STATES PATENTS 3,169,987  2/1965  Bloch _____ 260—671 X
3,248,443  4/1966  McEwan et al. _____ 260—671
3,320,174  5/1967  Rubinfeld.

DELBERT E. GANTZ, *Primary Examiner.*

C. R. DAVIS, *Assistant Examiner.*